US011132277B2

(12) United States Patent
Dalton et al.

(10) Patent No.: US 11,132,277 B2
(45) Date of Patent: Sep. 28, 2021

(54) SYSTEM AND METHOD FOR CONTINUOUS LOW-OVERHEAD MONITORING OF DISTRIBUTED APPLICATIONS RUNNING ON A CLUSTER OF DATA PROCESSING NODES

(71) Applicant: III Holdings 2, LLC, Wilmington, DE (US)

(72) Inventors: Niall Joseph Dalton, Mountain View, CA (US); Trevor Robinson, Austin, TX (US)

(73) Assignee: III Holdings 2, LLC, Wilmington, DE (US)

( * ) Notice: Subject to any disclaimer, the term of this patent is extended or adjusted under 35 U.S.C. 154(b) by 90 days.

(21) Appl. No.: 14/137,921

(22) Filed: Dec. 20, 2013

(65) Prior Publication Data

US 2014/0189104 A1 Jul. 3, 2014

Related U.S. Application Data

(60) Provisional application No. 61/747,022, filed on Dec. 28, 2012.

(51) Int. Cl.
*G06F 11/30* (2006.01)
*G06F 11/34* (2006.01)
(Continued)

(52) U.S. Cl.
CPC ...... *G06F 11/3096* (2013.01); *G06F 11/3006* (2013.01); *G06F 11/3024* (2013.01);
(Continued)

(58) Field of Classification Search
CPC ............ G06F 11/3409; G06F 11/3452; G06F 11/301; G06F 11/3051; G06F 11/3428;
(Continued)

(56) References Cited

U.S. PATENT DOCUMENTS 4,850,891 A 7/1989 Walkup et al.
5,495,533 A 2/1996 Linehan et al.
(Continued)

FOREIGN PATENT DOCUMENTS

WO WO 1999015999 4/1999

OTHER PUBLICATIONS

Intel, Architecture Guide: Intel® Active Management Technology, Intel.com, Oct. 10, 2008, pp. 1-23. (Year: 2008).*
(Continued)

*Primary Examiner* — Gregory G Todd
(74) *Attorney, Agent, or Firm* — Crowell & Moring LLP (57) ABSTRACT

Embodiments of the present invention provide an improvement over known approaches for monitoring of and taking action on observations associated with distributed applications. Application event reporting and application resource monitoring is unified in a manner that significantly reduces storage and aggregation overhead. For example, embodiments of the present invention can employ hardware and/or software support that reduces storage and aggregation overhead. In addition to providing for fine-grained, continuous, decentralized monitoring of application activity and resource consumption, embodiments of the present invention can also provide for decentralized filtering, statistical analysis, and derived data streaming. Furthermore, embodiments of the present invention are securely implemented (e.g., for use solely under the control of an operator) and can use a separate security domain for network traffic.

2 Claims, 4 Drawing Sheets

(51) Int. Cl.
  *G06F 15/78* (2006.01)
  *G06F 15/173* (2006.01)
  *G06F 9/50* (2006.01)
  *H04L 12/26* (2006.01)

(52) U.S. Cl.
  CPC ...... *G06F 11/3072* (2013.01); *G06F 15/7807* (2013.01); *G06F 15/7814* (2013.01); *G06F 9/5061* (2013.01); *G06F 11/3409* (2013.01); *G06F 15/17331* (2013.01); *G06F 2209/509* (2013.01); *G06F 2213/0038* (2013.01); *H04L 43/0876* (2013.01); *Y02D 10/00* (2018.01)

(58) Field of Classification Search
  CPC ..... G06F 2009/45591; G06F 15/17331; G06F 2209/509; G06F 9/5061; G06F 11/3024; G06F 11/3006; G06F 11/3024; G06F 11/3072; G06F 11/3096; G06F 15/7807; G06F 15/7814; G06F 15/7825; Y02D 10/00; H04L 43/0876
  See application file for complete search history.

(56) References Cited

U.S. PATENT DOCUMENTS

| | | | |
|---|---|---|---|
| 5,732,077 A | 3/1998 | Whitehead | |
| 5,801,985 A | 9/1998 | Roohparvar et al. | |
| 5,930,167 A | 7/1999 | Lee et al. | |
| 7,035,854 B2 | 4/2006 | Hsaio et al. | |
| 7,127,633 B1 | 10/2006 | Olson et al. | |
| 7,243,351 B2 | 7/2007 | Kundu | |
| 7,568,199 B2 | 7/2009 | Bozak et al. | |
| 8,196,133 B2 | 6/2012 | Kakumani et al. | |
| 9,288,147 B2* | 3/2016 | Kern | H04L 47/125 |
| 9,304,896 B2 | 4/2016 | Chandra et al. | |
| 2002/0059094 A1 | 5/2002 | Hosea et al. | |
| 2003/0065784 A1 | 4/2003 | Herrod | |
| 2003/0126013 A1 | 7/2003 | Shand | |
| 2003/0154112 A1 | 8/2003 | Neiman et al. | |
| 2004/0015973 A1 | 1/2004 | Skovira | |
| 2004/0073908 A1 | 4/2004 | Benejam et al. | |
| 2005/0038808 A1* | 2/2005 | Kutch | H04L 12/24 |
| 2006/0048157 A1 | 3/2006 | Dawson et al. | |
| 2006/0063690 A1 | 3/2006 | Billiauw et al. | |
| 2006/0120411 A1 | 6/2006 | Basu et al. | |
| 2006/0250971 A1 | 11/2006 | Gammenthaler et al. | |
| 2008/0034082 A1* | 2/2008 | McKinney | G06F 11/3466 709/224 |
| 2008/0270731 A1 | 10/2008 | Bryant et al. | |
| 2008/0289029 A1 | 11/2008 | Kim et al. | |
| 2009/0010153 A1 | 1/2009 | Filsfils et al. | |
| 2009/0055542 A1 | 2/2009 | Zhoa et al. | |
| 2009/0063690 A1 | 3/2009 | Verthein et al. | |
| 2010/0121947 A1 | 5/2010 | Pirzada et al. | |
| 2010/0325371 A1* | 12/2010 | Jagadish | G06F 11/3476 711/150 |
| 2011/0055627 A1 | 3/2011 | Zawacki et al. | |
| 2011/0153953 A1 | 6/2011 | Khemani et al. | |
| 2011/0154318 A1 | 6/2011 | Oshins et al. | |
| 2011/0173295 A1 | 7/2011 | Bakke et al. | |
| 2011/0179134 A1 | 7/2011 | Mayo et al. | |
| 2011/0274108 A1 | 11/2011 | Fan | |
| 2011/0320540 A1* | 12/2011 | Oostlander | G06F 11/3006 709/206 |
| 2012/0167083 A1* | 6/2012 | Suit | G06F 11/0712 718/1 |
| 2012/0167084 A1* | 6/2012 | Suit | G06F 11/3495 718/1 |
| 2012/0167094 A1* | 6/2012 | Suit | G06F 11/3452 718/100 |
| 2013/0094499 A1 | 4/2013 | Davis et al. | |
| 2013/0145375 A1 | 6/2013 | Kang | |
| 2013/0286840 A1 | 10/2013 | Fan | |
| 2013/0305093 A1* | 11/2013 | Jayachandran | G06F 11/0754 714/37 |
| 2014/0082614 A1* | 3/2014 | Klein | G06F 9/45558 718/1 |
| 2014/0135105 A1 | 5/2014 | Quan et al. | |
| 2014/0143773 A1* | 5/2014 | Ciano | G06F 9/5038 718/1 |
| 2015/0012679 A1 | 1/2015 | Davis et al. | |
| 2015/0301880 A1* | 10/2015 | Allu | G06F 11/0793 714/4.3 |

OTHER PUBLICATIONS

U.S. Appl. No. 13/899,751, filed May 22, 2013, Prashant R. Chandra.
U.S. Appl. No. 13/935,108, filed Jul. 3, 2013, Mark Bradley Davis.
U.S. Appl. No. 13/959,428, filed Aug. 5, 2013, Prashant R. Chandra.
Non-Final Office Action on U.S. Appl. No. 14/137,940 dated Jun. 3, 2016.
Final Office Action on U.S. Appl. No. 14/137,940 dated Nov. 3, 2016.
Final Office Action on U.S. Appl. No. 14/137,940 dated Jan. 25, 2018.
Non-Final Office Action on U.S. Appl. No. 14/137,940 dated Jun. 9, 2017.
Non-Final Office Action on U.S. Appl. No. 14/137,940 dated Aug. 10, 2018.
Notice of Allowance on U.S. Appl. No. 14/137,940 dated Jan. 30, 2019.
Caesar et al., "Design and Implementation of a Routing Control Platform," Usenix, NSDI '05 Paper, Technical Program, obtained from the Internet, on Apr. 13, 2021, at URL <https://www.usenix.org/legacy/event/nsdi05/tech/full_papers/caesar/caesar_html/>, 23 pages.

* cited by examiner

SYSTEM AND METHOD FOR CONTINUOUS LOW-OVERHEAD MONITORING OF DISTRIBUTED APPLICATIONS RUNNING ON A CLUSTER OF DATA PROCESSING NODES

CROSS REFERENCE TO RELATED APPLICATIONS

This patent application claims priority from U.S. Provisional Patent Application having Ser. No. 61/747,022, filed 28 Dec. 2012, entitled "FLEET SERVICE SOLUTIONS", having a common applicant herewith and being incorporated herein in its entirety by reference.

BACKGROUND

1. Field of the Invention

The embodiments of the present invention relate to activity tracing and resource consumption monitoring in data processing systems. More specifically, embodiments of the present invention relate to systems and methods for continuous low-overhead monitoring of distributed applications running within a cluster of data processing nodes.

2. Description of Related Art

Typical distributed application monitoring generally involves two or more independent mechanisms. A first example of such a mechanism is applications that are instrumented with tracing calls to an event logging application programming interface (API). A second example of such a mechanism is resource monitoring that is performed by a program or process running on each computing node and which invoked to perform an intended task. Such a program or process is commonly referred to as a daemon.

With regard to applications that are instrumented with tracing calls to an event logging API, the logging API may store event data in multiple locations. The most common locations are a) per-process, plain text log files stored on a local disk drive and b) an operating system event log (Unix syslogd or Windows Event Log). To avoid CPU and storage overhead from formatting and storing event messages, most events are disabled (or only enabled for statistical sampling) by default. When troubleshooting functionality or performance problems, an operator may enable various subsets of events temporarily. The subsets are usually selected by specifying a severity threshold (e.g. error, warning, info, debug1, debug2) and/or a set of software modules. Often, enabling or disabling log messages requires restarting the application. Unfortunately, the need to enable logging after observing a problem requires the problem to be reproduced, which isn't always easy or even feasible. Due to the overhead of enabling tracing, which may incur thread serialization (e.g. locking) in a multi-threaded program, the application may experience timing changes which alter its behavior from that previously observed with tracing disabled.

With regard to resource monitoring that is performed by a daemon running on each computing node, the daemon can be configured to monitor (i.e., a resource monitor) overall hardware utilization (e.g. CPUs, disk drives, and network) and/or per-process activity. Metrics are gathered at a fixed interval and then stored on disk or sent via the network to an aggregating daemon. Because the resource monitor runs on the node being monitored, some amount of resource utilization overhead is incurred by the daemon itself. A visualization application may then produce charts using the aggregated data. Generally, the resource monitor has no visibility into the specific operations being performed by the monitored applications, and therefore cannot correlate resource utilization with specific application operations.

SUMMARY

Embodiments of the present invention provide an improvement over known approaches for monitoring of and taking action on observations associated with distributed applications. Application event reporting and application resource monitoring is unified in a manner that significantly reduces storage and aggregation overhead. For example, embodiments of the present invention can employ hardware and/or software support that reduces storage and aggregation overhead. In addition to providing for fine-grained, continuous, decentralized monitoring of application activity and resource consumption, embodiments of the present invention can also provide for decentralized filtering, statistical analysis, and derived data streaming. Furthermore, embodiments of the present invention are securely implemented (e.g., for use solely under the control of an operator) and can use a separate security domain for network traffic.

In view of the disclosure made herein, a skilled person will appreciate that embodiments of the present invention offer a number of advantageous and beneficial functionalities. One such functionality is a remotely observable, controllable, and programmable hardware and activity resource monitor that runs out of band on separate dedicated hardware, observing, filtering, aggregating, and reporting operator- or programmer-defined metrics or events. Another such functionality is metrics and events generated by the resource monitor or by applications (either explicitly or by usage of instrumented APIs) are sent to a messaging endpoint such as an administrative console or to a remote memory for diagnostic or profiling use. Another such functionality is all events are time-stamped with extremely low overhead using a timestamp register that is automatically synchronized across the cluster using dedicated hardware. Still another such functionality is an operator having the ability to change a subset of reported events or their destination using an administrative tool.

In one embodiment, a method of monitoring application-driven activity in an application central processing unit of a data processing node comprises a plurality of operations. An application monitoring services module of a data processing node performs an operation for receiving at least one resource monitor command. A management processor unit of the data processing node comprises the application monitoring services module and is coupled to an application central processing unit of the data processing node. In response to receiving the at least one monitor command, the application monitoring services module performs an operation for configuring an assessment protocol thereof dependent upon a resource assessment specification provided in the at least one monitor command. In accordance with the assessment protocol, the application monitoring services module performs an operation for assessing activity of the application central processing unit that arise from execution of an application running thereon and for outputting information derived from the activity to a recipient.

In another embodiment, a data processing node comprises a plurality of application central processing units each having a respective application running thereon and a management processor unit coupled to each one of the application central processing units. The management processor unit comprises an application monitoring services module including a resource assessor and an event reporter. The management processor unit comprises dedicated system resources with respect to the application central processing units such that processes implemented by the application monitoring services module are out-of-band of application processes carried out on each one of the application central processing units. The application monitoring services module is configured to selectively implement one or more processes for assessing activity of a particular one of the application central processing units that arise from execution of the respective application running thereon and is configured to selectively implements one or more processes for outputting events generated by a particular one of the application central processing units that arise from execution of the respective application running thereon.

In another embodiment, a data processing system comprises a plurality of data processing nodes coupled to each other through an interconnect fabric. Each one of the data processing nodes comprises an application central processing unit and a management processor unit coupled to the application central processing unit. The application central processing unit of each one of the data processing nodes has an instance of a particular application running thereon. The management processor unit of each one of the data processing nodes comprises an application monitoring services module. The application monitoring services module of each one of the data processing nodes outputs a respective stream of time-stamped events that arise from execution of the instance of the particular application running on the application central processing unit thereof. A target node, which can be one of the data processing nodes or an external node (e.g., operator interface console) receives the respective stream of time-stamped events from each one of the data processing nodes and generates a composite stream of events from the time-stamped events of at least a portion of the respective streams thereof. The composite stream of events is time-sequenced dependent upon global time-stamp information of each one of the time-stamped events.

These and other objects, embodiments, advantages and/or distinctions of the present invention will become readily apparent upon further review of the following specification, associated drawings and appended claims.

DETAILED DESCRIPTION

Figure 1:
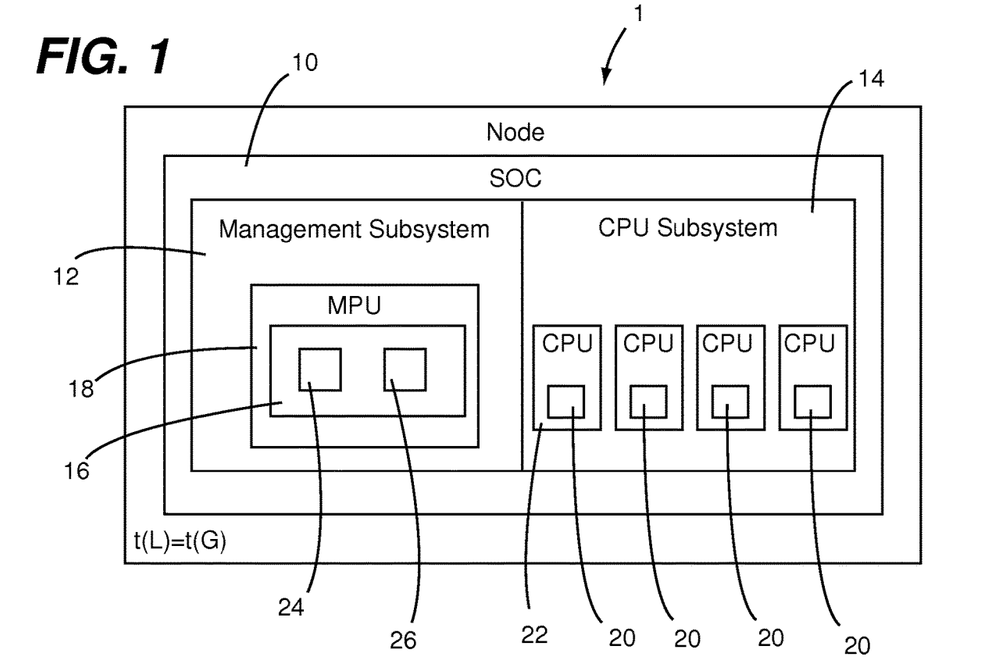
FIG. 1 is a diagrammatic view of a data processing node configured in accordance with an embodiment of the present invention.

As shown in FIG. 1, a data processing node 1 having a system on a chip (SOC) 10 configured in accordance with an embodiment of the present invention. The SOC 10 has a management subsystem 12 and an application CPU subsystem 14 coupled to the management subsystem 12. Application monitoring services 16 are implement as one or more processes that reside in the management subsystem 12 and run on a management processor unit (MPU) 18. User applications 20, which can be different applications, different instances of the same application, etc, reside in the application CPU subsystem 14 and run on a respective one of more of a plurality of application central processing units (CPUs) 22. Each one of the application CPUs 22 includes one or more application processors and dedicated system resources ((e.g., memory, operating system, etc). The MPU 18 includes one or more dedicated management processors and associated dedicated system resources (e.g., memory, software, utilities, status registers, UARTs, network MACs, SOC configuration information, etc) that execute management software for providing initialization and ongoing management (e.g., both autonomic and remotely controlled) of the SOC 10. In this regard, the application monitoring services 16 and portions of the MPU 18 utilized for carrying out processes of the application monitoring services 16 are referred to herein as an application monitoring services module.

The application monitoring services 16 include a resource assessor 24 and an event reporter 26. As will be appreciated from the following disclosures, embodiments of the present invention provide for application monitoring services to be implemented in a programmable manner. Such programmability enables monitoring and reporting of activities and events to be selectively configured by an operator or other entity. For example, a command issued by the resource assessor 24 or the event reporter 26 can include a resource assessment specification upon which an assessment protocol used by the application monitoring services module is configured. In effect, the resource assessment specification included information defining a manner in which events and activities are to be monitored and/or reported and the assessment protocol is a framework in which the application monitoring services module applies such information in performing the monitoring and/or reporting.

The resource assessor 16 takes action based on observations associated with the distributed applications (e.g., a first daemon process) and the event reporter reports such event 24 (e.g., a second daemon process). In this regard, the event reporter and the resource assessor are independent, but related services. The observations used by the resource assessor 24 may be events reported by the event reporter 26. But, the observations will generally be periodic measurements gathered from a common component that both the resource assessor 24 and event reporter 26 use as a data source. As will be discussed below in greater detail, the resource assessor 24 and the event reporter 26 provide for an improvement over known approaches for monitoring of events associated with distributed applications and taking action on observations associated with the distributed applications. Such a distributed application can be distributed across application CPUs of a plurality of data processing nodes, which can be on a common node card or a plurality of different node cards. Nodes of the node cards can be interconnected by a fabric or other type of node interconnect structure. Further details of interconnecting nodes by a fabric are described in U.S. Non-Provisional patent application Ser. No. 13/705,340 filed on Apr. 23, 2012 and entitled "SYSTEM AND METHOD FOR HIGHPERFORMANCE, LOW-POWER DATA CENTER INTERCONNECT FABRIC", which is incorporated herein in its entirety by reference.

The resource assessor 24 is implemented as an out-of-band management process on each data processing node of a system (e.g., a cluster of nodes including data processing node 1). This management process is out-of-band because it runs on the MPU core 18 of the management subsystem 12 and, therefore, does not consume resources of the application CPUs 22. By transparently observing the application CPUs 22, resource assessor 24 can notify an operator or other entity if resource consumption (e.g., CPU, memory, network, etc.) exhibits a condition that warrants such notification. Examples of such conditions include, but are not limited to, a change in resource consumption that exceeds one or more resource operating limits of the node (e.g., a preset rate of change, a sustained excursion outside a preset limit, or the like). In some implementations, the resource assessor 24 is implemented in conjunction with an agent running within an operating system (OS) of an application CPU. For example, this agent may be necessary to measure application CPU utilization because the resource assessor 24 may not be able to distinguish the OS idle loop from actual work.

Figure 2:
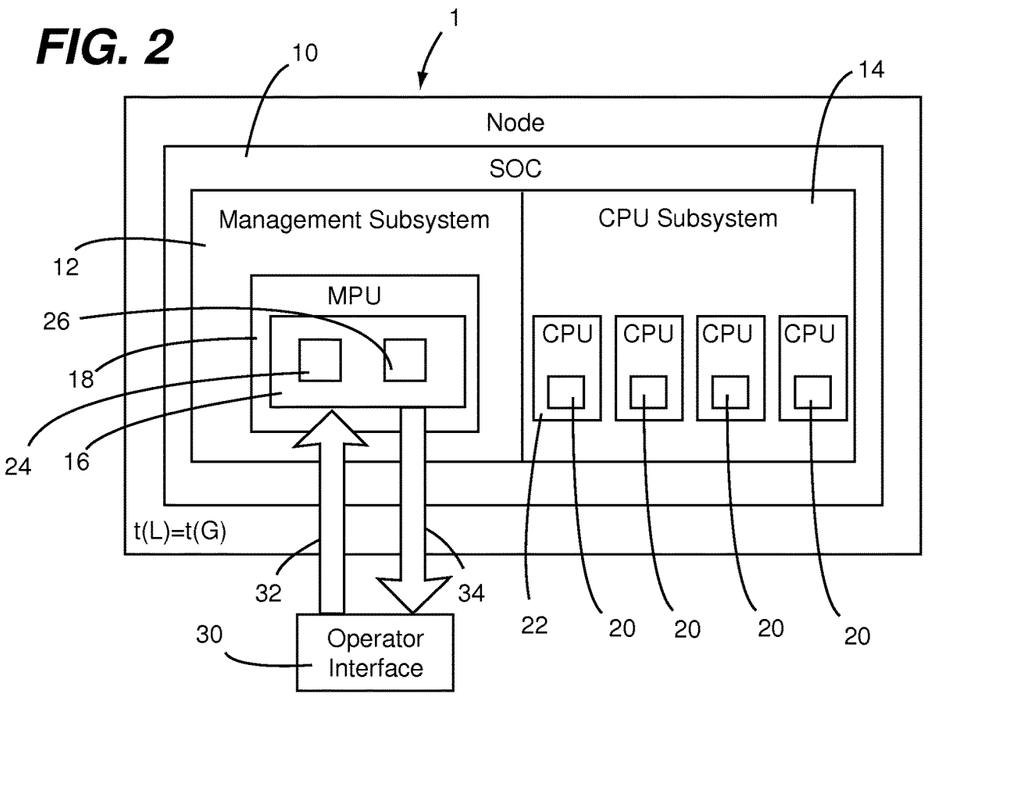
FIG. 2 is a diagrammatic view showing an arrangement of a resource monitor within the data processing node of FIG. 1.

Referring now to FIG. 2, the resource assessor 24 runs within the MPU 18 on the data processing node 1 (and all or a portion of other nodes connected to thereto). The resource assessor 24 is remotely accessible by an operator interface 30 (i.e., event/information target). Although the target of the events is illustrated as an external operator (i.e., the operator interface 30), this may in fact be a peer node in a cluster of nodes rather than an external target. In fact, some set of nodes may choose to observe the operation of one another to ensure correct operation, as the mechanism provides a generally accessible and programmable tracing feature.

Resource assessor commands 32 (i.e., a form of a resource monitor command) are provided from the operator interface 30 to the resource assessor 24. Resource assessor information 34 such as, for example, derived data, alerts and the like is provided from the resource assessor 24 to the operator interface 30 in response to the resource assessor commands 32. The resource assessor 24 may observe the execution and actions of user application processes each running within a respective application CPU 22 of the data processing node 1.

The resource operating limits, which are used by the resource assessor 24 to identify operating/behavior changes, can be operator defined or can be statistically derived from data being monitored by the resource assessor 24. For example, the operator may program the resource assessor 24 using the operator interface to histogram typical message sizes. Statistically significant deviations in such sizes are typically indicative of misbehavior of the observed processes. Because the resource assessor 24 is a programmable process, it can also be used to implement filtering of data, statistical analysis of the data stream to reduce the data volume, and streaming of the original or derived data to other nodes in the cluster continuously, periodically or when anomalies are identified. In this regard, in response to receiving a resource monitoring command, the application monitoring services module configures an assessment protocol dependent upon a resource assessment specification provided in the resource assessor command (e.g., to histogram typical message sizes) and, in accordance with the assessment protocol, the application monitoring services module assessing activity of the application central processing unit(s) that arise from execution of a user application running thereon outputs information derived from the activity (e.g., histogram(s)) to target recipient (e.g., the operator interface 30).

In view of the disclosures made herein, a skilled person will appreciate that the resource assessor 24 offers the following capabilities and functionalities. Application execution and use of machine resources can be directly observed in a manner requiring no changes to user operating system or application. No cooperation or knowledge of the user application is required. Fine-grained continuous on-node monitoring is provided using CPU cores and hardware peripherals of a management subsystem (i.e., resources that are isolated from an application CPU subsystem connected to the management subsystem), which minimizes overhead on the user application and exposes micro-bursting behavior, which is otherwise difficult to observe. Programmable computations are performed on collected data, allowing the operator to push monitoring code towards each node for scaling of resource assessing with the cluster size.

Figure 3:
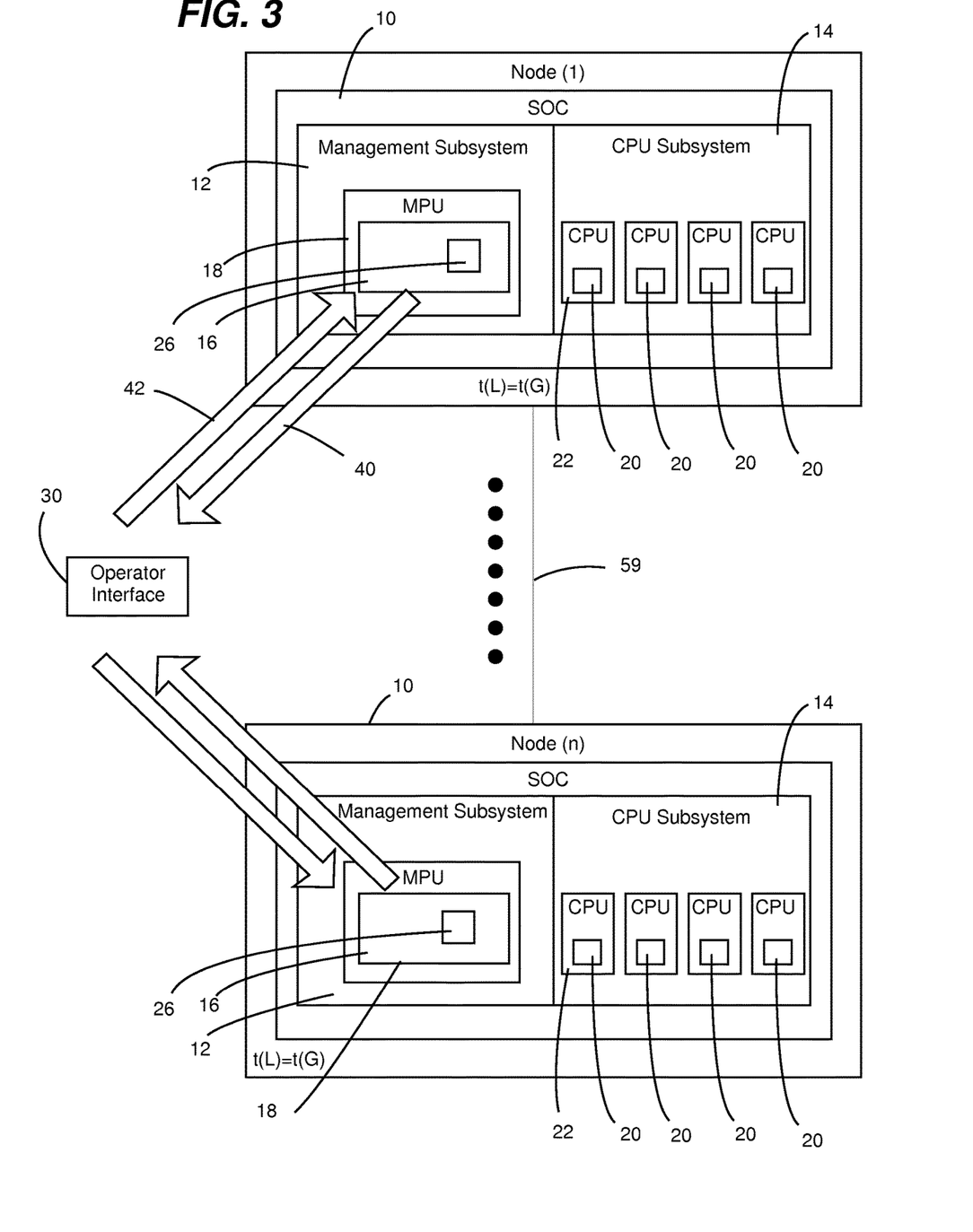
FIG. 3 is a diagrammatic view showing a management processor implementation of an event reporter within the data processing node of FIG. 1.

As disclosed above in reference to FIG. 1, the application monitoring services 16 include an event reporter 26. For application running in a single-node or a multiple-node (distributed) manner, fine-grained insight into their execution is required for operational, debugging and profiling/tuning reasons. As shown in FIG. 3, the event reporter 26 executes on MPU 18 of a plurality of data processing nodes (i.e., node 1 to node N, which can be coupled to each other via fabric 59) in a manner that is isolated from their application CPUs 22. Resource assessor commands 42 (i.e., a form of a resource monitor command) are provided from the operator interface 30 to the nodes 1 for enabling events to be traced and reported on. Upon receipt of the commands, the event reporter 26 produces resource event information 40 in the form of a stream of time-stamped events from the respective data processing node to the operator interface 30. The stream of time-stamped events (i.e., trace data) is provided to the operator interface console 30, a remote memory location or both (i.e., target nodes) until a STOP command is received. An operator can use commands to enable all tracing events to be produced, select some subset, or provide expressions used to evaluate whether any given event should be produced. This mechanism is independent of the user operating system or application and may be used to trace system provided event sources. The event reporter 26 uses resources of the MPU 18 to manage trace data collection and can also use remote memory (via coarse-grained, large-block RDMA or fine-grained, cache line-sized access) and shared memory ring buffers for collection and aggregation. The event reporter can be configured to immediately transmit events to a remote node such that they are retained and available even if a source node of the events becomes inaccessible (i.e., a data recorder).

As disclosed above, the event reporter 26 can leverage and/or be built-upon functionalities such as, for example, shared ring buffers, remote memory, and/or node-to-node time synchronization. Further details of implementing the none-to-node time synchronization functionality are described in U.S. Non-Provisional patent application Ser. No. 13/899,751 filed on May 22, 2013 and entitled "TIME SYNCHRONIZATION BETWEEN NODES OF A SWITCHED INTERCONNECT FABRIC", which is incorporated herein in its entirety by reference. Further details of implementing shared ring buffer functionality are described in U.S. Non-Provisional patent application Ser. No. 13/959,428 filed on Aug. 5, 2013 and entitled "REMOTE MEMORY RING BUFFERS IN A CLUSTER OF DATA PROCESSING NODES", which is incorporated herein in its entirety by reference. Further details of implementing remote memory functionality are described in U.S. Non-Provisional patent application Ser. No. 13/935,108 filed Jul. 3, 2013 and entitled "IMPLEMENTING REMOTE TRANSACTION FUNCTIONALITIES BETWEEN DATA PROCESSING NODES OF A SWITCHED INTERCONNECT FABRIC", which is incorporated herein in its entirety by reference.

Figure 4:
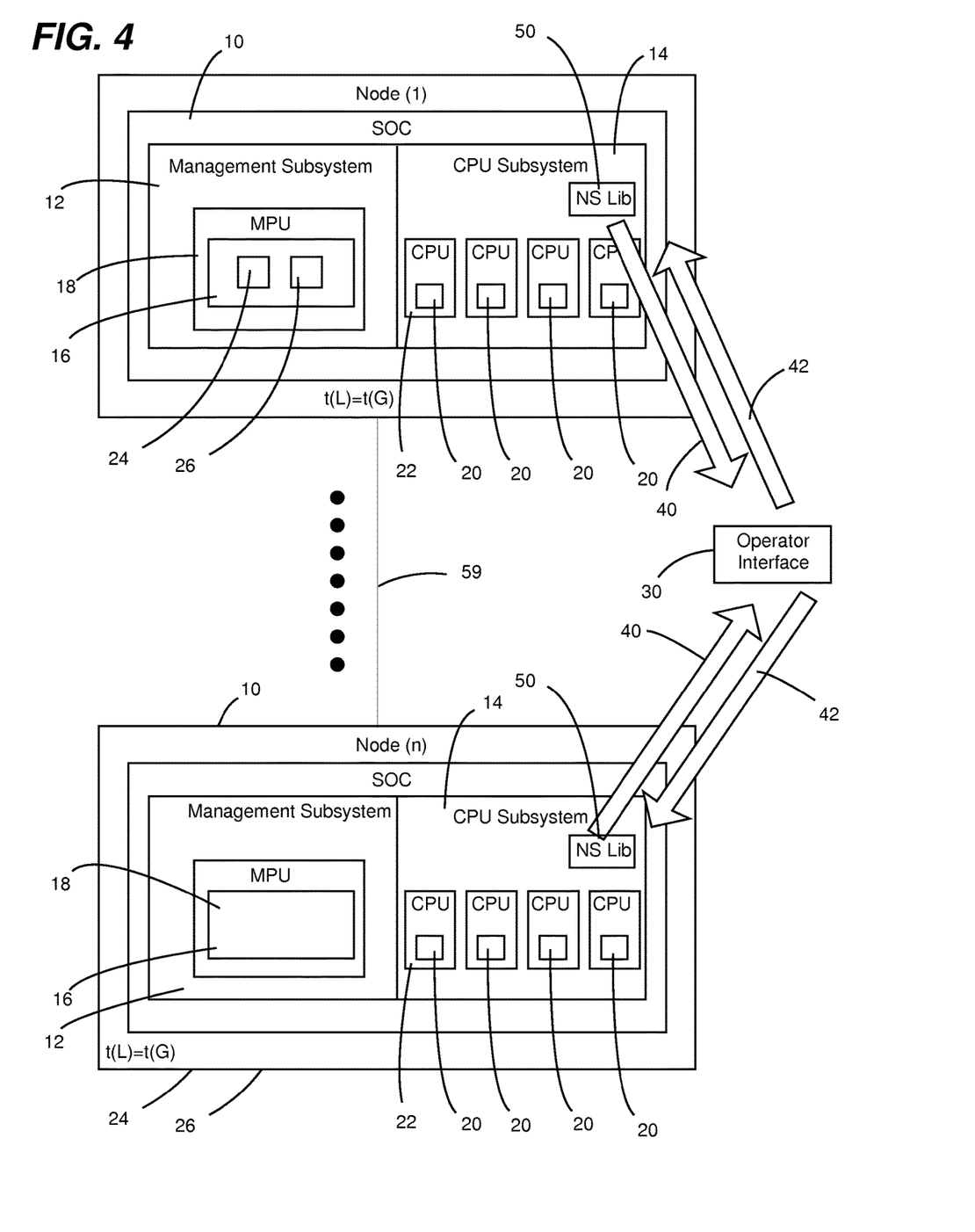
FIG. 4 is a diagrammatic view showing an embedded library implementation of an event reporter within the data processing node of FIG. 1.

Referring now to FIG. 4, the same flow of commands and data streams as shown above in reference to FIG. 3 are shown, except with the producer of resource event information 40 being a node services library (NS Lib) code 50 of the application CPU subsystem 14 as opposed to the MPU 12 of the management subsystem 12. Applications can use a suitable application programming interface (API) to emit tracing events that are aggregated in remote memory or sent to an aggregating node via a messaging API (feature provided by the NS Lib code 50). The messaging API may also be configured to emit its own tracing events. An API that includes the ability to emit tracing events containing arbitrary diagnostic information can be provided for languages such as, for example, C, C++, etc.

These events reported by the event reporter 26 are time-stamped via suitable time-stamp register that is synchronized across all nodes in a cluster (e.g., node 1 to node N). This synchronization of time-stamping across all nodes in a cluster (i.e., via node-to-node time synchronization) results in the events reported by the event reporter 26 being time stamped in accordance with time information that is global with respect to all of the nodes (i.e., global timestamp information). For example, the time stamp applied to each one of the events can be based upon a global time (t(G)) to which a local time (t(L)) of each node in a cluster of nodes is synchronized. This global time stamping enables a recipient of the events to correlate the events (e.g., generate a time-sequenced stream of events therefrom) and to analyze in a meaningful fashion the events generated on a multitude of nodes. It has extremely low overhead and so it is possible to permanently or selectively enable this across an entire cluster, unlike the existing state of the art. As disclosed above, further details of implementing the none-to-node time synchronization functionality are described in U.S. Non-Provisional patent application Ser. No. 13/899,751 filed on May 22, 2013 and entitled "TIME SYNCHRONIZATION BETWEEN NODES OF A SWITCHED INTERCONNECT FABRIC", which is incorporated herein in its entirety by reference.

In either of the disclosed implementation of the event reporter 26 (i.e., the management processor implementation as shown and discussed in reference to FIG. 3 or the embedded library implementation as shown and discussed in reference to FIG. 4), the operator or programmer may dynamically inject filtering logic to implement filtering or other analysis prior to event generation. This may be used to minimize the amount of events generated by identifying the most important or anomalous ones. In at least one embodiment, filtering is used to limit the volume of trace data to avoid overwhelming the system or the administrators. An example of filtering is to associate a severity, such as error, warning, or informational, with each trace event and only retaining events above a specified threshold. Also, different subsystems can be assigned different severity thresholds.

Presented now is a discussion regarding an implementation of the event reporter 26 in which it is configured to transmits events to a remote node immediately such that they're retained and available even if the source node becomes inaccessible. Accordingly, if a monitored machine crashes, the monitoring data up to the point of the crash is safely stored elsewhere. Such an implementation of the event reporter 26 is referred to herein as a data recorder.

The underlying functionality of the data recorder involves using hardware mechanisms such as, for example, remote memory and/or shared ring buffers to gather monitoring data in real-time with low overhead. Because these remote memories and ring buffers are hardware managed, the overhead for their use by the application is very low, allowing us to continuously generate events if desired. Furthermore, preferred implementations of remote memory and shared ring buffers operate in a non-blocking mode such that an application initiates a remote memory transfer without waiting for the transaction to complete. For example, use of node fabric hardware to perform the transfer in the background without application CPU intervention ensures that forward progress of the application is not blocked. The buffers of events may then be observed continuously or on-demand by the operator or programmer to debug, profile, or investigate the execution of the system, including processes running on many different nodes targeting the same event buffer. As disclosed above, further details of implementing shared ring buffer functionality are described in U.S. Non-Provisional patent application Ser. No. 13/959,428 filed on Aug. 5, 2013 and entitled "REMOTE MEMORY RING BUFFERS IN A CLUSTER OF DATA PROCESSING NODES", which is incorporated herein in its entirety by reference, and further details of implementing remote memory functionality are described in U.S. Non-Provisional patent application Ser. No. 13/935,108 filed Jul. 3, 2013 and entitled "IMPLEMENTING REMOTE TRANSACTION FUNCTIONALITIES BETWEEN DATA PROCESSING NODES OF A SWITCHED INTERCONNECT FABRIC", which is incorporated herein in its entirety by reference.

The data recorder provides a novel way to observe and investigate the operation of the cluster with data collected before, during, and after normal or anomalous execution. The remote memory or ring buffers may be sized appropriately to capture the last N events, or the typical number of events in a certain period of time. Optionally, if the events are emitted in a separate security domain (e.g., a particular node of a cluster of nodes), the events may not be spoofed or observed by users of the cluster. This implements an irrevocable log of actions by the processes being traced. If the events captured by the data recorder are emitted in a separate security domain, then for safety or security reasons, event data tracing may be monitored by a process/person without permission to interact with the application itself. For example, systems operators may observe the correct operation of a production application without interacting with it. Such a separate security domain can be implemented, for example, at a particular node of a cluster of data processing nodes or at a node (i.e., apparatus) external to the cluster of data processing nodes (e.g., an operator interface console).

Figure 5:
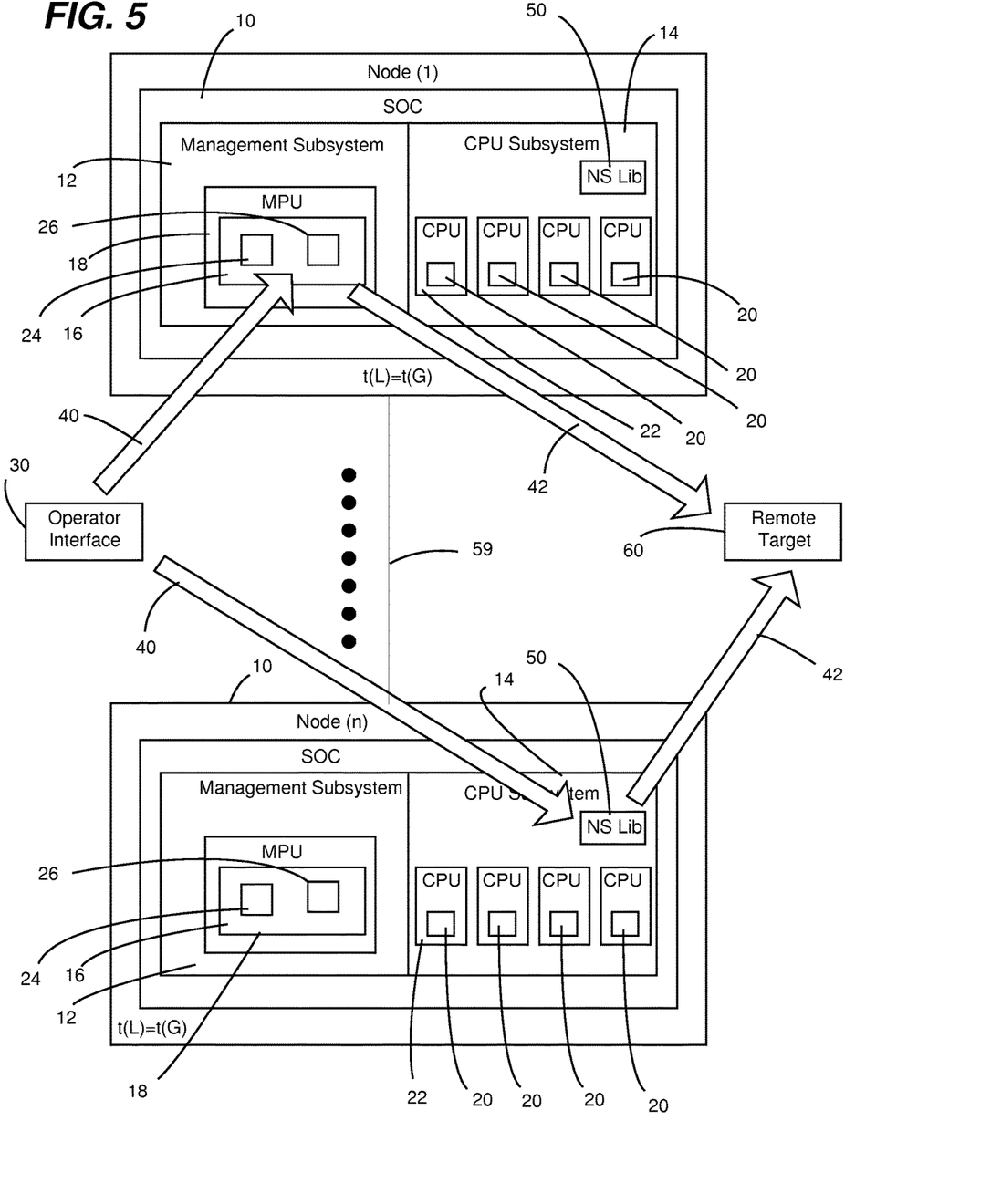
FIG. 5 is a diagrammatic view showing an embodiment of a process for implementing a data recorder within the data processing node of FIG. 1.

Referring now to FIG. 5, an embodiment of a process for implementing the data recorder is shown. A plurality of nodes 1-*n* within a cluster, which can be connected to each other via an interconnected fabric 59, are streaming events to a remote target 60 (e.g., a remote memory or remote memory ring buffer) within the cluster. A command and control process at an operator interface 30, which may be internal or external to the cluster, issues commands 40 to the nodes 1-*n*. One or more of the nodes (e.g., node 1) is streaming events 42 from the event reporter 26 while one or more other nodes (e.g., node n) is streaming events 42 from an application level context (e.g., the node service library NS Lib 50). In both cases, the same remote memory or ring buffer may be the target of the events, even though they are being generated in different contexts (i.e., system context vs. user context). Also, although the operator interface 30 (e.g., a control process thereof) is an external entity, the decision to enable tracing could also be made by either the event reporter 26 (i.e., a management processor process) or the node service library NS Lib 50 (i.e., a user application code). For example, if a particular user application encounters an error situation, a user application code can enable the particular user application to begin to generate events into remote memory for later investigation. Besides debug and profiling information, the events may also be data generated by the user applications.

It has been disclosed herein that a suitable remote memory ring buffers can provide low-overhead, non-blocking transmission of tracing events to a remote aggregation node. However, there are limits to the frequency at which events can be transmitted within a node, between nodes and/or to an operator interface. To accommodate applications that generate many events in sporadic bursts, an application tracing library initially writes events to a per-thread circular queue in local memory. The events in the queue are consumed by a separate (asynchronous) thread or process that merges the events in chronological order based on their timestamps. Because each queue has a single producer (e.g., guaranteed by being per-thread) and a single consumer (e.g., a constraint enforced by the software), it can utilize low-overhead, wait-free synchronization between the producer and the consumer. Wait-freedom is a term of art that describes the strongest non-blocking guarantee of progress, combining guaranteed system-wide throughput with starvation-freedom for all threads of execution. Single-producer, single-consumer synchronized queues are a well-known, simple data structure that can be implemented without special atomic primitives.

In is disclosed herein that a data processing system (e.g., a server) configured in accordance with the present invention can provide numerous types of event trace (i.e., event reporter) buffer consumers. Each of these consumers can run in numerous places such as, for example, one or more applications of a node generating the events, an event reporter running on one or more application cores of one or more nodes, or the event reporter running on the management processing unit of one or more nodes. Management interfaces in each event reporter process provide for dynamic configuration of consumers. One example of such a trace buffer consumer is a process merger that runs in a background thread, merging per-thread buffers into a per-process buffer, annotating each event with its thread of origin. The destination buffer can be in one or more remote memories, providing fault tolerance and redundancy/fan-out. Another example of such a trace buffer consumer is a system merger that runs in a separate process, potentially on one of the dedicated management cores, merging per-thread or per-process buffers into a system-wide buffer and annotating each event with its thread and process of origin. This consumer requires the source buffers to be in shared local memory. As with the process merger, the destination buffer can be in remote memory. Another example of such a trace buffer consumer is a formatter that transforms binary trace events stored in a thread, process, or system buffer into human-readable text. Another example of such a trace buffer consumer is a message sender that sends buffer contents or formatter output to one or more messaging endpoints using a suitable messaging (i.e., node messaging functionality), which automatically chooses the fastest transport available, such as remote direct memory access (RDMA). Writing to multiple remote endpoints provides fault tolerance and redundancy/fan-out. Another example of such a trace buffer consumer is a message receiver that receives buffer contents or formatter output from a message sender. Another example of such a trace buffer consumer is a disk writer that writes buffer contents or formatter output to non-volatile storage. Still another example of such a trace buffer consumer is a shared ring buffer writer that writes buffer contents or formatter output to a remote memory ring buffer. Shared ring buffers provide hardware-accelerated aggregation/fan-in from multiple trace sources.

When composed into an event distribution, aggregation, and storage network, these consumers provide a highly-customizable means of handling a large amount of monitoring data in real-time. While most consumers run asynchronously, waiting for a signal from the producer, which may in fact be another consumer, they can also run synchronously when composed within the same process. For example, a system merger that gathers events generated asynchronously can synchronously invoke a formatter for each merged event, and that formatter could in turn synchronously invoke a disk writer to store the generated text on a local disk. At any stage, including the event producer, trace events can be filtered or aggregated using system- and user-defined rules. An example of system-defined rules includes source subsystem, thread, or process ID or event severity, such as errors, warnings, or configuration changes.

As presented above, a resource assessor configured in accordance with the present invention and an event reporter configured in accordance with an embodiment of the present invention (i.e., application monitoring services) can be implemented on a data processing node. Furthermore, it has been disclosed that a preferred implementation is on a data processing node comprising a system on a chip (SOC). However, in view of the disclosures made herein, a skilled person will appreciate that implementation of application monitoring services is not limited to a particular type or configuration of data processing node or data processing apparatus.

In view of the disclosures made herein, a skilled person will appreciate that a system on a chip (SOC) refers to integration of one or more processors, one or more memory controllers, and one or more I/O controllers onto a single silicon chip. Furthermore, in view of the disclosures made herein, the skilled person will also appreciate that a SOC configured in accordance with the present invention can be specifically implemented in a manner to provide functionalities definitive of a server. In such implementations, a SOC in accordance with the present invention can be referred to as a server on a chip. In view of the disclosures made herein, the skilled person will appreciate that a server on a chip configured in accordance with the present invention can include a server memory subsystem, a server I/O controllers, and a server node interconnect. In one specific embodiment, this server on a chip will include a multi-core CPU, one or more memory controllers that support ECC, and one or more volume server I/O controllers that minimally includes Ethernet and SATA controllers. The server on a chip can be structured as a plurality of interconnected subsystems, including a CPU subsystem, a peripherals subsystem, a system interconnect subsystem, and a management subsystem.

An exemplary embodiment of a server on a chip that is configured in accordance with the present invention is the ECX-1000 Series server on a chip offered by Calxeda incorporated. The ECX-1000 Series server on a chip includes a SOC architecture that provides reduced power consumption and reduced space requirements. The ECX-1000 Series server on a chip is well suited for computing environments such as, for example, scalable analytics, web-serving, media streaming, infrastructure, cloud computing and cloud storage. A node card configured in accordance with the present invention can include a node card substrate having a plurality of the ECX-1000 Series server on a chip instances (i.e., each a server on a chip unit) mounted on the node card substrate and connected to electrical circuitry of the node card substrate. An electrical connector of the node card enables communication of signals between the node card and one or more other instances of the node card.

The ECX-1000 Series server on a chip includes a CPU subsystem (i.e., a processor complex) that uses a plurality of ARM brand processing cores (e.g., four ARM Cortex brand processing cores), which offer the ability to seamlessly turn on-and-off up to several times per second. The CPU subsystem is implemented with server-class workloads in mind and comes with an ECC L2 cache to enhance performance and reduce energy consumption by reducing cache misses. Complementing the ARM brand processing cores is a host of high-performance server-class I/O controllers via standard interfaces such as SATA and PCI Express interfaces. Table 3 below shows technical specification for a specific example of the ECX-1000 Series server on a chip.

TABLE 3

Example of ECX-1000 Series server on a chip technical specification

| | |
|---|---|
| Processor Cores | 1. Up to four ARM ® Cortex ™-A9 cores @ 1.1 to 1.4 GHz |
| | 2. NEON ® technology extensions for multimedia and SIMD processing |
| | 3. Integrated FPU for floating point acceleration |
| | 4. Calxeda brand TrustZone ® technology for enhanced security |
| | 5. Individual power domains per core to minimize overall power consumption |
| Cache | 1. 32 KB L1 instruction cache per core |
| | 2. 32 KB L1 data cache per core |
| | 3. 4 MB shared L2 cache with ECC |
| Fabric Switch | 1. Integrated 80 Gb (8 × 8) crossbar switch with through-traffic support |
| | 2. Five (5) 10 Gb external channels, three (3) 10 Gb internal channels |
| | 3. Configurable topology capable of connecting up to 4096 nodes |
| | 4. Dynamic Link Speed Control from 1 Gb to 10 Gb to minimize power and maximize performance |
| | 5. Network Proxy Support to maintain network presence even with node powered off |
| Management Engine | 1. Separate embedded processor dedicated for systems management |
| | 2. Advanced power management with dynamic power capping |
| | 3. Dedicated Ethernet MAC for out-of-band communication |
| | 4. Supports IPMI 2.0 and DCMI management protocols |
| | 5. Remote console support via Serial-over-LAN (SoL) |
| Integrated Memory Controller | 1. 72-bit DDR controller with ECC support |
| | 2. 32-bit physical memory addressing |
| | 3. Supports DDR3 (1.5 V) and DDR3L (1.35 V) at 800/1066/1333 MT/s |
| | 4. Single and dual rank support with mirroring |
| PCI Express | 1. Four (4) integrated Gen2 PCIe controllers |
| | 2. One (1) integrated Gen1 PCIe controller |
| | 3. Support for up to two (2) PCIe x8 lanes |
| | 4. Support for up to four (4) PCIe x1, x2, or x4 lanes |
| Networking Interfaces | 1. Support 1 Gb and 10 Gb Ethernet |
| | 2. Up to five (5) XAUI 10 Gb ports |
| | 3. Up to six (6) 1 Gb SGMII ports (multiplexed w/XAUI ports) |
| | 4. Three (3) 10 Gb Ethernet MACs supporting IEEE 802.1Q VLANs, IPv4/6 checksum processing, and TCP/UDP/ICMP checksum offload |
| | 5. Support for shared or private management LAN |

TABLE 3-continued

Example of ECX-1000 Series server on a chip technical specification

| | |
|---|---|
| SATA Controllers | 1. Support for up to five (5) SATA disks |
| | 2. Compliant with Serial ATA 2.0, AHCI Revision 1.3, and eSATA specifications |
| | 3. SATA 1.5 Gb/s and 3.0 Gb/s speeds supported |
| SD/eMMC Controller | 1. Compliant with SD 3.0 Host and MMC 4.4 (eMMC) specifications |
| | 2. Supports 1 and 4-bit SD modes and 1/4/8-bit MMC modes |
| | 3. Read/write rates up to 832 Mbps for MMC and up to 416 Mbps for SD |
| System Integration Features | 1. Three (3) I2C interfaces |
| | 2. Two (2) SPI (master) interface |
| | 3. Two (2) high-speed UART interfaces |
| | 4. 64 GPIO/Interrupt pins |
| | 5. JTAG debug port |

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more non-transitory computer readable medium(s) having computer readable program code embodied thereon.

Any combination of one or more computer readable medium(s) (e.g., non-transitory computer readable medium(s)) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are/can be described herein with reference to textual descriptions, flowchart illustrations and/or block diagrams of methods, apparatus (systems) and computer program products according to embodiments of the present invention. It will be understood that portions of the textual descriptions, flowchart illustrations and/or block diagrams, and combinations thereof can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the textual descriptions, flowchart illustrations and/or block diagrams, and combinations thereof. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the textual descriptions, flowchart illustrations and/or block diagrams, and combinations thereof. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the textual descriptions, flowchart illustrations and/or block diagrams, and combinations thereof.

While the foregoing has been with reference to a particular embodiment of the invention, it will be appreciated by those skilled in the art that changes in this embodiment may be made without departing from the principles and spirit of the disclosure, the scope of which is defined by the appended claims.

What is claimed is:

1. A data processing node, comprising:
a plurality of application central processing units each having a respective application running thereon; and
a management processor unit coupled to each one of the application central processing units, wherein the management processor unit comprises an application monitoring services module including a resource assessor and an event reporter, wherein the management processor unit comprises dedicated system resources with respect to the application central processing units such that processes implemented by the application monitoring services module are out-of-band of application processes carried out on each one of the application central processing units, wherein the processes implemented by the application monitoring services module are performed on the management processor unit and do not consume resources of the application central processing units, wherein the application monitoring services module is configured to selectively implement one or more processes for assessing activity of a particular one of the application central processing units that arise from execution of the respective application running thereon and is configured to selectively implement one or more processes for outputting events generated by a particular one of the application central processing units that arise from execution of the respective application running thereon, wherein the processes implemented by the application monitoring services module include alerting an external entity of resource consumption by a particular one of the application central processing units exceeding an operating limit; wherein:
the data processing node is one node within a cluster of interconnected nodes and implements a security domain not accessible by the external entity, wherein another node in the cluster of nodes implements a different security domain accessible by the external entity, and wherein outputting the events includes transmitting the events to the another node, thereby enabling the events to be monitored by the external entity without allowing the external entity to interact with the respective application by which the events were generated;
the application monitoring services module performs processes for assessing activity of the particular one of the application central processing units that arise from execution of the respective application running thereon;
assessing activity of the particular one of the application central processing units includes using a filter function to manipulate execution of the respective application running thereon to influence a manner in which the events are generated;
outputting the events includes applying a time stamp to each one of the events;
the data proccessing node is one node within a cluster of interconnected nodes; and
the time stamp applied to each one of the events is based upon a global time to which a local time of each one of the nodes is synchronized.

2. The data processing node of claim 1, wherein outputting the events includes outputting the events using a messaging functionality of an application level context.

* * * * *

UNITED STATES PATENT AND TRADEMARK OFFICE
CERTIFICATE OF CORRECTION

Page 1 of 1

PATENT NO. : 11,132,277 B2
APPLICATION NO. : 14/137921
DATED : September 28, 2021
INVENTOR(S) : Niall Joseph Dalton It is certified that error appears in the above-identified patent and that said Letters Patent is hereby corrected as shown below:

In the Claims

Column 14, Claim 1, Lines 52-53, delete "the data processing node is one node within a cluster of interconnected nodes;".

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*